United States Patent [19]

Jackson

[11] Patent Number: 4,987,409

[45] Date of Patent: Jan. 22, 1991

[54] LEVEL SENSOR AND ALARM

[76] Inventor: Ronald E. Jackson, 216 W. Southport Rd., Indianapolis, Ind. 46217

[21] Appl. No.: 342,090

[22] Filed: Apr. 24, 1989

[51] Int. Cl.[5] ............................................. G08B 21/00
[52] U.S. Cl. ...................................... 340/623; 73/308; 200/84 R
[58] Field of Search ............... 340/612, 617, 618, 620, 340/623, 624, 625; 73/305–308; 200/61.05, 84 R

[56] References Cited

U.S. PATENT DOCUMENTS

| | | | |
|---|---|---|---|
| 3,102,175 | 8/1963 | Eichenberger, Jr. ............ | 340/617 X |
| 3,392,580 | 7/1968 | Bain et al. ......................... | 340/606 X |
| 3,786,464 | 1/1974 | Staempfi ............................. | 340/623 |
| 4,086,457 | 4/1978 | Niedermeyer .................... | 340/623 X |
| 4,155,082 | 5/1979 | Jones et al. ......................... | 340/656 |
| 4,600,314 | 7/1986 | Theriault ......................... | 340/628 X |

*Primary Examiner*—Joseph A. Orsino
*Assistant Examiner*—Jeffery A. Hofsass
*Attorney, Agent, or Firm*—Reynolds Locke

[57] ABSTRACT

An alarm system is disclosed for use with a water softener including a salt-brine tank containing a bed of salt. The alarm system includes a sensor situated in the salt-brine tank on the top of the bed of salt, an electronic circuit including an alarm, and an input for connecting the circuit to the sensor. The sensor is responsive to direct contact with the brine for operating the circuit to initiate the alarm in the event the top of the bed of salt drops below a preselected level or the brine rises above another preselected level.

12 Claims, 3 Drawing Sheets

LEVEL SENSOR AND ALARM

BACKGROUND OF THE INVENTION

The present invention relates generally to sensors including an alarm for sensing the level of pulverant material relative to the level of a liquid within the same container. The invention has particular utility with respect to sensing the level of salt within a salt-brine tank of a household water softener.

Household water softeners generally include a vessel containing an ion exchange resin intended to remove calcium and other minerals from a supply of water used within the household. From time to time, generally once every day or two, it becomes necessary to recharge the ion exchange resin so it can continue to perform its intended function. The recharging is accomplished by introducing a brine solution into the resin deck whereby a reverse ion exchange takes place freeing the calcium and other undesired ions which can then be flushed from the system and down the drain. Once the system is recharged, an amount of water is introduced into a tank containing block or particulate salt to form a new supply of brine for the next recharge cycle.

On introduction of the fresh water into contact with the salt, a portion of the salt dissolves in the water thereby lowering the level of the salt within the salt-brine tank. After a number of recharged cycles, it becomes necessary to add salt to the salt-brine tank. Since the recharging generally occurs automatically, little thought is given to the operation of the water softener system. Often, one senses that a water softener is out of salt only when one senses that the water no longer is as soft as desired and discovers that the salt-brine tank is out of salt and contains only a desired level of water. It is therefore an object of the present invention to alert a householder when the level of salt within the salt-brine tank has fallen below a desired minimum level and in particular below the maximum water level within the tank.

On rare occasions, a water softener ceases to operate in the intended fashion and, rather than introducing a desired or measured supply of water into the salt-brine tank following a recharging of the ion resin bed, the system continues to introduce an excessive amount of water to the point that the salt-brine tank may even overflow which can cause significant damage to surrounding equipment, household furnishings, and the like. It is therefore an object of the present invention to provide an alarm which will alert the householder in the event that an excessive amount of water is introduced into the salt-brine tank.

SUMMARY OF THE INVENTION

In accordance with the present invention, an alarm system generally comprises a sensor which is situated on the top of a bed of pulverant material within a container. An electronic circuit is provided which includes an alarm and an input for connecting the circuit to the sensor. The sensor includes means responsive to direct contact with the liquid for operating the circuit to initiate the alarm in the event that the top of the bed of pulverant material drops below a preselected level, or the liquid rises above another preselected level.

Preferably, the alarm sensor comprises a pair of conductors having a first end connected to the input of the circuit and a second end situated on the top of the bed of pulverant material, the second end of the pair of conductors being exposed to permit direct conduction through the liquid in the event the second end becomes submerged in the liquid.

A particularly advantageous sensor for use in connection with the system comprises an envelope, a gravitationally responsive switch fixed within the envelope, and a ballast mass fixed to the envelope, the amount of ballast being slight enough to render the sensor as a whole to be buoyant, the position of the ballast with respect to the switch being such as to cause the switch to operate when the sensor is in its normal floating or buoyant attitude.

Additional features of the invention will become apparent to those skilled in the art upon consideration of the following detailed description of a preferred embodiment exemplifying the best mode of carrying the invention as present perceived. The detailed description particularly refers to the accompanying figures.

DETAILED DESCRIPTION OF THE PREFERRED EMBODIMENTS

Figure 1:
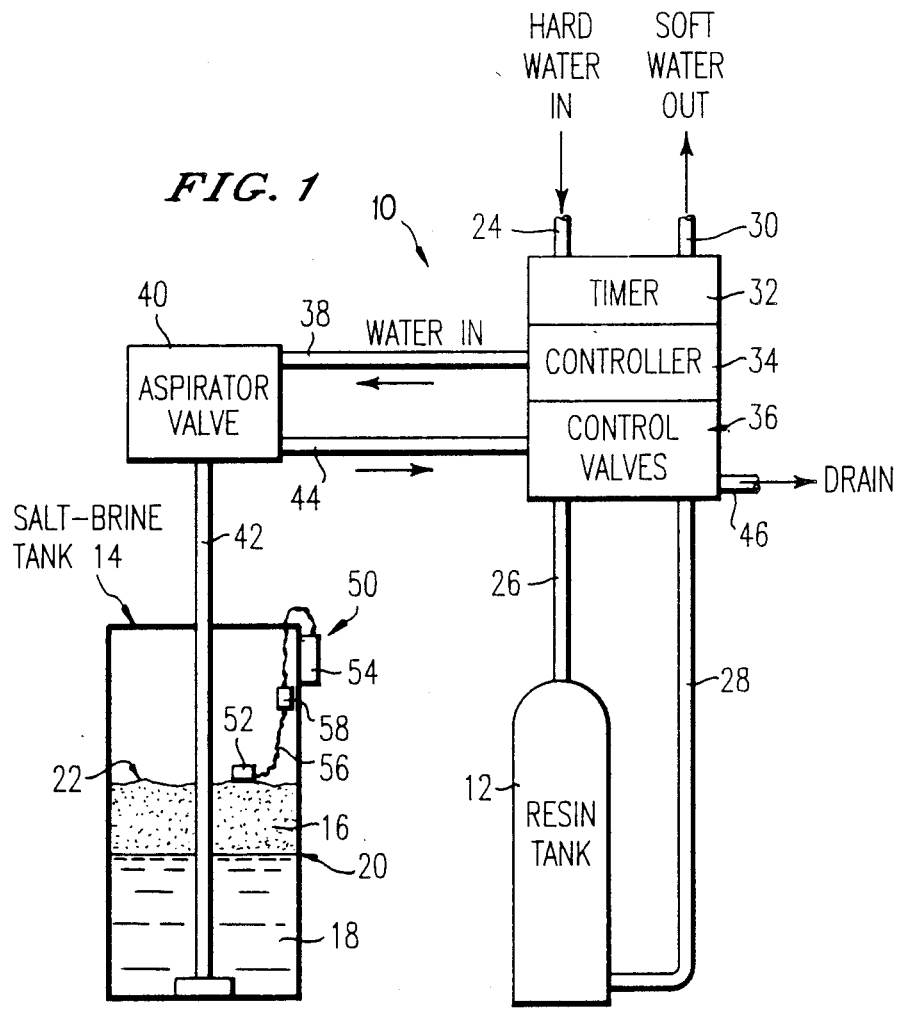
FIG. 1 is a schematic view of a water softener system including an alarm system in accordance with the present invention.

A household water softening system 10 is schematically shown in FIG. 1. The system 10 includes a resin tank 12 containing an ion exchange resin and a salt-brine tank 14 which is shown to contain a bed of pulverant salt 16 and an amount of brine 18. The top surface of the brine 20 is illustrated to be below the top surface 22 of the salt which is the most desirable condition for the contents of the salt-brine tank 14. Hard water from a supply enters the water softening system 10 through conduit 24. Except during the recharge cycle, the hard water proceeds immediately through conduit 26 into the resin tank where the water intermediately contacts the ion exchange resin contained within the resin tank 12. The intermediate contact with the ion exchange resin causes the hard water to lose calcium and other ions and thereby become softened and exit the resin tank through conduit 28. The soft water then proceeds in the normal course through conduit 30 for use throughout the particular household involved.

On a periodic basis, usually set by timer 32, a controller 34 causes the ion exchange resin within resin tank 12 to become recharged. This is accomplished through the use of various control valves 36. During the recharge cycle, an amount of water coming through conduit 24, is diverted to conduit 38 and through aspirator valve 40. As the water passes through aspirator valve 40, a negative pressure is created in line 42, which extends to the bottom of the salt-brine tank thereby causing brine 18 within the tank 14 to proceed upward to the aspirator valve 40 where it is mixed with the water flowing through the aspirator valve 40. The mixed water and brine then proceeds through conduit 44 into a control valve 36 where it is directed through conduit 26 into the resin tank 12. Upon introduction of the brine mixture into the resin tank 12, the ion exchange resin gives up the calcium, magnesium, and other ions which have previously been captured by the resin. These released ions then flow with the flow of water through conduit 28 to control valve 36 which directs this water through conduit 46 to a drain.

The recharge cycle may include certain backwashing steps and repetitive introductions of brine as are necessary to accomplish the desired objective of recharging the ion exchange resin. When the recharging cycle is nearly finished, an amount of soft water coming out of conduit 28 is directed by control valve 36 backwards through conduit 44 to aspirator valve 40. The aspirator valve 40 directs this reverse flow of water through conduit 42 into the salt-brine tank to fill the tank to the desired level 20. After the water has been so introduced into the salt-brine tank, the control valves 36 are again changed by controller 34 back to the original operating position.

The system 10 is supplied with an alarm system 50 in accordance with the present invention. The alarm system generally comprises a sensor 52 situated in the salt-brine tank 14 on the top 24 of the bed of salt 16. An electronic circuit 54 is shown mounted to the outside of the salt-brine tank but can be mounted at any convenient location in reasonable proximity to the salt-brine tank 14. An input 56 connects the sensor 52 to the electronic circuit 54 and can include a mounting element 58 for controlling the location of the input within the tank 14. The sensor 52 generally includes means responsive to direct contact with the brine 18 for operating the circuit 54 to initiate the alarm in the event that top 22 of the bed of salt 16 drops below level 20 which represents the normal top level of the brine 18. The responsive means is also responsive to direct contact with the brine 18 so as to operate the circuit 54 so as to initiate the alarm in the event that the brine 18 rises above the preselected level 20 and in particular above the top 22 of the bed of salt 16.

Figure 2:
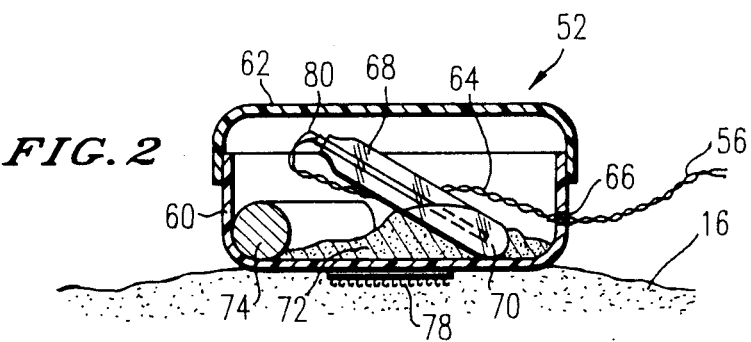
FIG. 2 is a sectional view of a particularly advantageous sensor constructed in accordance with the present invention.

One embodiment for the sensor 52 is illustrated in FIG. 2 and is shown to comprise a body 60 and cap 62 which telescope together to define a buoyant envelope. A pair of wires 64 penetrates the envelope at an opening 66 which is sealed against the entry of moisture to connect with input wires 56. The wires 64 are attached to two contacts of mercury switch 68 which includes a pool of mercury 70. The pool of mercury 70 is moveable by gravity within the switch 68 in response to changes in the attitude in the switch 68. The initial attitude of the switch 68 is biased by means of an adhesive mass 72 securing the switch 68 to the cup 60 at the illustrated inclined attitude. The cup 60 also includes a ballast mass 74 which is of a size such that the sensor 52 as a whole will float in water or brine. The position of the ballast 74 is such that when the sensor 52 is floating, the ballast mass 74 assumes the lowest most position and upper edge 76 assumes the highest position.

While the sensor 54 is in the attitude as illustrated, the pool of mercury 70 within the switch does not operate the alarm. But if the sensor 52 assumes an attitude such that upper edge 76 becomes upper most while ballast mass 74 becomes lower most, the pool of mercury 70 will gravitationally move to the opposite end of switch 68 from that which is now illustrated thereby causing the alarm circuit 54 to operate. Attached to the body 60 is a small segment of adherent fabric 78 which can be used to attach the sensor 52 to sensor support 58 while the salt-brine tank is being filled with salt.

A somewhat simpler sensor can be constructed by merely providing the pair of conductors 64 with the ends 80 of conductors 64 exposed outside of body 60 and lying on top of the bed of salt 16. The ends of the conductors 80 must be separated and are preferably separated by a known distance. In the event that the level salt 16 within the salt-brine tank 14 should fall below the level of the brine, conduction through the brine between the ends 80 of the two conductors can occur thereby triggering the alarm circuit. So long as the ends 80 of the two conductors 64 remain out of contact within any ionized liquids, the alarm triggering conduction cannot take place.

Figure 3:
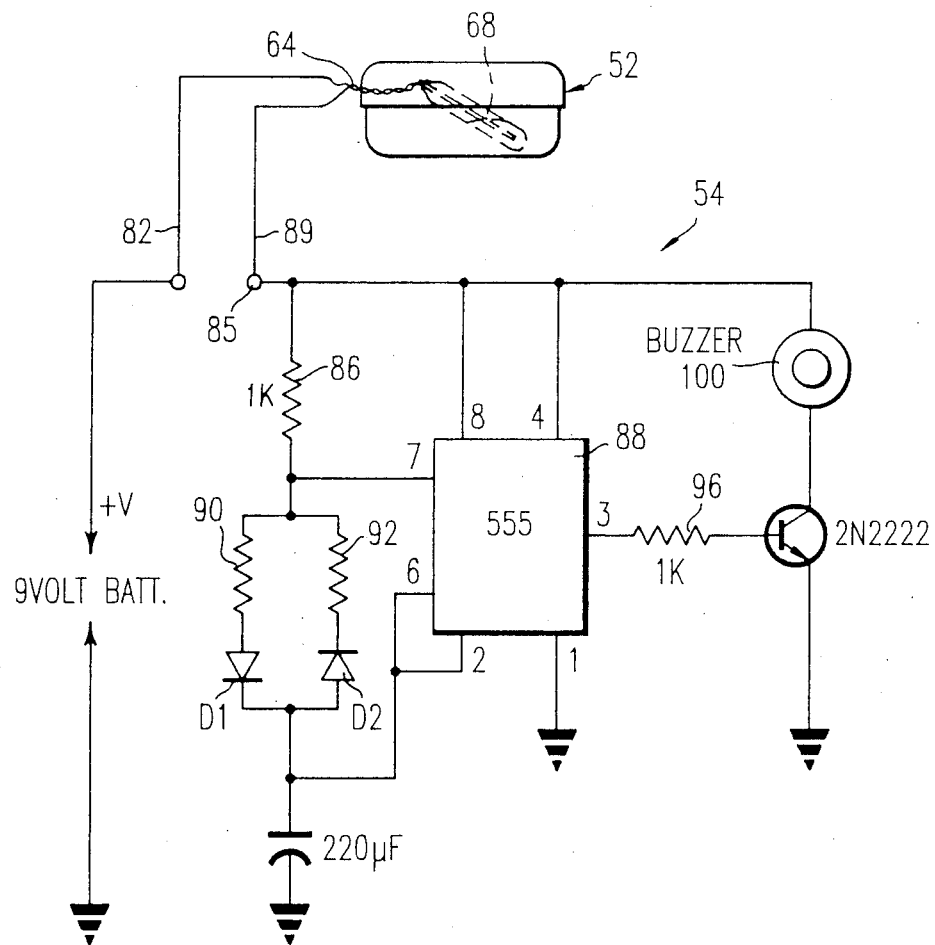
FIG. 3 is a schematic view of the electronic circuit including alarm and sensor of the present invention.

FIG. 3 illustrates a particularly advantageous alarm circuit 54 for use in connection with an alarm system 50 of the present invention. As discussed above, input 56 connects the sensor 52 to the electronic circuit 54. Input 56 includes a first wire 82 and a second wire 84 which are connected, respectively, to the first and second contacts of mercury switch 68 by the pair of wires 64. First wire 82 of input 56 is also coupled to the positive terminal of a 9 volt battery. The negative terminal of the 9 volt battery is coupled to ground.

Second wire 84 of input 56 connects switch 68 to an input terminal 85 of electronic circuit 54. When the sensor 52 assumes an attitude such that the mercury 70 closes the switch 68, the 9 volt battery is connected to the remainder of electronic circuit 54 to activate the buzzer or alarm 100. Input terminal 85 is coupled to pin 8, the Vcc input, of a standard 555 integrated circuit timer chip 88. The pin numbers illustrated in FIG. 3 are those applicable when this particular integrated circuit timer 88 is used. It should be understood that other timer circuits can be employed for the purposes for which the timer 88 described herein is used.

Pin 8 of timer 88 is also coupled to the reset of timer 88 at pin 4, to a first terminal of alarm 100, and through a 1 K resistor 86 to pin 7 of timer 88. Pin 7 of timer 88 is coupled through a resistor 90 to the anode of diode D1, and the cathode of diode D1 is coupled to pin 6 of timer 88. Pin 7 of timer 88 is also coupled through resistor 92 to the cathode of diode D2, and the anode of diode D2 is coupled to pin 6 of timer 88.

Pin 6 is coupled to ground through a 220 uF capacitor 94, the timing capacitor of the timer 88. Capacitor 94 is charged through resistors 86 and 92 and is discharged through resistor 90. Pin 6 of timer 88 is also coupled to pin 2. Pin 1 of timer 88 is coupled to ground.

The output of timer 88 from pin 3 is coupled through a 1 K resistor 96 to the base of transistor 98. The emitter of transistor 98 is coupled to ground, and the collector of transistor 98 is coupled to a second terminal of alarm 100. Transistor 98 may illustratively be a Motorola type 2N2222 transistor.

Timer 88 provides a clocking signal to turn the alarm 100 on and off. The output of timer 88 is an asymmetrical square wave alternating between a "high" voltage level output and a "low" voltage level output. The duration of the high level output from timer 88 is different from the duration of the low level output. The duty cycle of the timer 88, which is the ratio of the time the output signal from pin 3 is high compared to the time the output signal is low, can be adjusted to a desired ratio by selecting appropriate values for resistors 90 and 92.

Transistor 98 is arranged in a common-emitter switch configuration to control alarm 100. The input voltage signal from pin 3 of timer 88 is used to control the state of the common-emitter switch. When the voltage level of the signal from timer 88 is high, the transistor 98 acts as a closed switch to sound alarm 100. When the voltage level of the signal from timer 88 is low, transistor 98 acts as an open switch to shut off alarm 100. Therefore, a sequential series of sounds is generated from alarm 100 to alert the householder in the event that the bed of salt 16 drops below a preselected level or in the event that the brine 18 rises above a preselected level.

Since the alarm system 50 is powered by a 9 volt battery, to preserve battery life it is preferable that the values for resistors 90 and 92 be selected to give a fairly short sound of a few seconds or less spaced by a silent period of a quarter hour or more.

Figure 4:
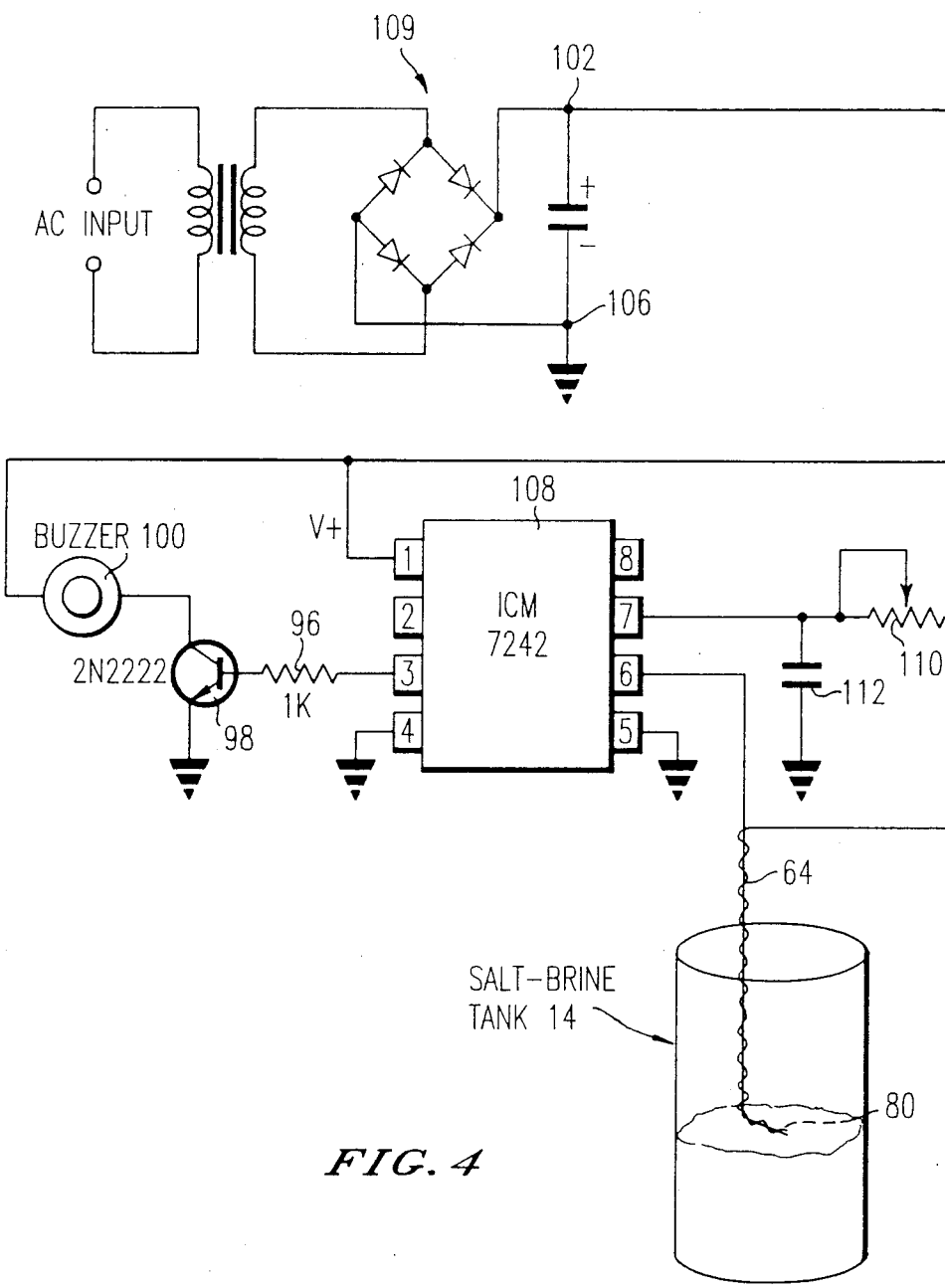
FIG. 4 is a schematic view of an alternative electronic circuit in accordance with the invention.

An alternative embodiment for an alarm system 50 in accordance with the present invention is shown in FIG. 4 to include a pair of conductors 64 having second ends 80 exposed to permit direct contact with and conduction through the brine within the salt-brine tank 14 in the event the brine rises to a level equal to the top of the salt. One of the pair of conductors 80 is connected to the positive output 102 of a conventional full-wave rectifier circuit 104. The negative output 106 or circuit 104 is grouded. The other of the pair of conductors 80 is connected to pin 6 of a standard ICM 7242 integrated circuit timer chip 108. The pin numbers illustrated in FIG. 4 are those applicable when this particular integrated circuit timer 108 is used. It should be understood that other timer circuits can be employed for the purposes for which the timer 108 described herein is used.

Pin 6 of timer 108 in the trigger input for the circuit which initiates the measurement of a period of time. The length of time actually measured is determined by the RC time constant of resistor 110 and capacitor 112 which are connected to pin 7 of timer 108. Resistor 110 is illustrated to be variable in value to permit the owner of the unit to vary the length of time measured by the circuit. The output of timer 108 from pin 3 is coupled through a 1 K resistor 96 to the base of transistor 98. The emitter of transistor 98 is coupled to ground, and the collector of transistor 98 is coupled to a second terminal of alarm 100 in a manner similar to the circuit shown in FIG. 3. Transistor 98 may again illustratively be a Motorola type 2N2222 transistor.

In operation, as the salt level in tank 14 falls, or the brine level raises, the ends 80 of conductors 64 can become emmersed in the brine. This results in conduction occuring through the brine thereby triggering the timing circuit 108. After a period of time established by resistor 110 and capacitor 112, a continuous signal is supplied to pin 3 which will not be removed unless and until the positive potential is removed from pin 6 and/or pin 1. This causes the alarm 100 to sound continuously following the initial delay measured by the circuit 108.

The practical utility for the delay will be appreciated when one considers that the recharging of the system typically occurs during periods of minimum water use such as some time between 1:00 A.M. and 5:00 A.M. On other hand, the owner of such an alarm would probably prefer to not be awakened in the middle of the night by the alarm just because the salt level is a little too low. Thus the time delay is to permit the alarm to sound at a more reasonable time following the triggering event. To achieve about a five hour delay, the capacitor 112 can have a value of 100 $\mu f$ while the resistor 110 is set to a value of 1.4 M$\Omega$. Since the power for the alarm system 50 is provided from an A.C. imput such as a wall socket, there is no need to be concerned with perserving battery life as was the situation in the system shown in FIG. 3.

Although the invention has been described in detail with reference to the preferred embodiments, variations and modifications exist within the scope and spirit of the invention as described and defined in the following claims.

What is claimed is:

1. An alarm system for use with a water softener including a salt-brine tank containing a bed of salt comprising:
   a sensor situated in the salt-brine tank on the top of the bed of salt, an electronic circuit including an alarm, and an input for connecting the circuit to the sensor, the sensor including means responsive to direct contact with the brine for operating the circuit to initiate the alarm in the event the top of the bed of salt drops below a preselected level or the brine rises above another preselected level,
   wherein the sensor comprises a pair of conductors having a first end connected to the input of the circuit and a second end situated on the top of the bed of salt,
   wherein the sensor further comprises an attitude responsive witch means connected to the second end of the pair of conductors, and
   wherein the sensor further comprises buoyant means for causing the switch means to float at or near the surface of any brine rising above the top of the bed of salt.

2. The alarm system of claim 1 wherein the sensor further comprises ballast means for regulating the attitude of the switch means in the event of any brine rising above the top of the bed of salt.

3. The alarm system of claim 1 wherein the sensor further comprises a conductivity sensing means located at the second end of the conductors for sensing the electrical conductivity of the environment immediately surrounding the second end of the conductors.

4. An alarm system for use with a water softener including a salt-brine tank containing a bed of salt comprising:
   an electronic circuit including an alarm, and an input for connecting the circuit to a sensor comprising a pair of conductors having a first end connected to the input of the circuit and a second end situated in a salt-brine tank on the top of the bed of salt, the sensor including means responsive to direct contact with the brine for operating the circuit to initiated the alarm in the event the top of the bed of salt drops below a preselected level or the brine rises above another preselected level, and
   wherein the sensor further comprises a buoyant element including a gravitationally responsive switch situated such that the normal attitude of the buoyant element while floating causes the switch to operate thereby initiating the alarm.

5. The alarm system of claim 4 wherein the circuit initiated the alarm only after an initial delay of several hours to prevent the alarm from sounding in the middle of the night.

6. The alarm system of claim 4 wherein following initiation of the alarm, the alarm is sounded only periodically for a few seconds and made to remain silent for much longer periods to preserve the life of the source of power for the system.

7. An alarm system for use in a salt-brine tank of a water softener, the alarm system comprising:
an alarm, means for sensing an abnormal condition inside the tank and supplying a signal to the alarm indicative of the abnormal condition, means for coupling the sensing means to the alarm, the coupling means including means for delaying initiation of the alarm for a predetermined period of time after the sensing means signals the abnormal condition, the sensing means including a sensor, situated in the tank on top of a bed of salt, the sensor including means responsive to direct contact with a brine solution inside the tank to generate the signal indicative of the abnormal condition and initiate the alarm in the event the top of the bed of salt drops below a preselected level or that the brine rises above another preselected level, the sensor including a buoyant element including a gravitationally responsive switch and means situated inside the buoyant element for orienting the buoyant element while floating such that the normal attitude of the buoyant element while floating causes the switch to operate thereby initiating the alarm.

8. The alarm system of claim 7, wherein the delaying means includes a timer circuit for controlling the length of the delay time, the timer circuit having an input and an output, the sensing means being coupled to the input of the timer circuit and the output of the timer circuit being coupled to the alarm.

9. The alarm system of claim 8, wherein the timer circuit includes means for varying the delay time for initiating the alarm.

10. The alarm system of claim 8, wherein the delay time is about five hours.

11. The alarm system of claim 7, wherein the buoyant element includes an envelope, the gravitationally responsive switch being fixed within the envelope, and the orienting means includes a ballast mass fixed within the envelope, the amount of the ballast mass being slight enough to render the sensor as a whole to be buoyant, the position of the ballast mass with respect to the switch being such as to cause the switch to operate when the sensor is in its normal floating attitude.

12. The alarm system of claim 7, wherein following initiation of the alarm, the alarm is sounded only periodically and is made to remain silent for much longer periods to preserve the life of a source of power for the alarm system.

* * * * *